US009469049B2

(12) United States Patent
Lindner

(10) Patent No.: US 9,469,049 B2
(45) Date of Patent: Oct. 18, 2016

(54) METHOD AND INSTALLATION FOR SEPARATING INDIVIDUAL VALUABLE MATERIALS FROM MIXED, IN PARTICULAR MILLED, PLASTIC WASTE

(75) Inventor: Wolfgang L. Lindner, Dormagen (DE)

(73) Assignee: APK Aluminum und Kunststoff AG, Merseburg (DE)

(*) Notice: Subject to any disclaimer, the term of this patent is extended or adjusted under 35 U.S.C. 154(b) by 1173 days.

(21) Appl. No.: 13/128,053

(22) PCT Filed: Nov. 9, 2009

(86) PCT No.: PCT/EP2009/007991
§ 371 (c)(1),
(2), (4) Date: Jul. 20, 2011

(87) PCT Pub. No.: WO2010/052016
PCT Pub. Date: May 14, 2010

(65) Prior Publication Data
US 2011/0266377 A1 Nov. 3, 2011

(30) Foreign Application Priority Data
Nov. 7, 2008 (DE) .................. 10 2008 056 311

(51) Int. Cl.
B03B 5/00 (2006.01)
B29B 17/02 (2006.01)
(Continued)

(52) U.S. Cl.
CPC ............... B29B 17/02 (2013.01); B03B 5/28 (2013.01); B03B 9/061 (2013.01); C08J 11/06 (2013.01); B29B 17/04 (2013.01); B29B 2017/0203 (2013.01); B29B 2017/0234 (2013.01); B29B 2017/0244 (2013.01); B29B 2017/0293 (2013.01); B29B 2017/0484 (2013.01); B29B 2017/0488 (2013.01); B29K 2023/06 (2013.01); B29K 2023/065 (2013.01); B29K 2023/12 (2013.01); B29K 2105/065 (2013.01); B29K 2705/02 (2013.01); B29L 2007/008 (2013.01); B29L 2009/003 (2013.01);
(Continued)

(58) Field of Classification Search
CPC .......... B03B 5/28; B03B 5/30; B03B 17/02; B03B 2017/0234; B03B 2017/0244
USPC ........................ 209/18, 172, 172.5, 173, 930
See application file for complete search history.

(56) References Cited

U.S. PATENT DOCUMENTS 5,246,116 A * 9/1993 Kirk .................................. 209/3
2003/0027877 A1* 2/2003 Jody et al. ...................... 521/40
(Continued)

FOREIGN PATENT DOCUMENTS

DE 19637031 3/1998
DE 19751441 5/1999
(Continued)

Primary Examiner — Joseph C Rodriguez
Assistant Examiner — Kalyanavenkateshware Kumar
(74) Attorney, Agent, or Firm — Fay Sharpe LLP

(57) ABSTRACT

The invention relates to a method and to an installation for separating individual valuable materials from mixed, in particular milled, plastic waste, comprising film parts, laminated film parts and hard plastic parts, plus optionally impurities. Any impurities are separated from the plastic waste. Next the plastic waste is separated into hard plastics and films as well as laminates, and the hard plastics are separated from the films, and finally the hard plastics are separated into the different types of plastic. At least one separation step comprises a sink-or-float separation.

15 Claims, 8 Drawing Sheets

(51) Int. Cl.
  *B03B 5/28* (2006.01)
  *B03B 9/06* (2006.01)
  *C08J 11/06* (2006.01)
  *B29B 17/04* (2006.01)
  *B29K 23/00* (2006.01)
  *B29K 105/06* (2006.01)
  *B29K 705/02* (2006.01)
  *B29L 7/00* (2006.01)
  *B29L 9/00* (2006.01)
  *B29L 31/00* (2006.01)

(52) U.S. Cl.
  CPC .... *B29L 2031/7166* (2013.01); *Y02W 30/524* (2015.05); *Y02W 30/622* (2015.05); *Y02W 30/625* (2015.05); *Y02W 30/701* (2015.05)

(56) References Cited

U.S. PATENT DOCUMENTS

| | | | |
|---|---|---|---|
| 2003/0141225 A1* | 7/2003 | Liddle et al. | 209/18 |
| 2007/0187299 A1* | 8/2007 | Valerio | 209/12.1 |
| 2007/0272597 A1* | 11/2007 | De Feraudy et al. | 209/3.1 |
| 2008/0110806 A1* | 5/2008 | Koslow | 209/162 |
| 2008/0257794 A1* | 10/2008 | Valerio | 209/567 |
| 2009/0194465 A1* | 8/2009 | Toida et al. | 209/162 |

FOREIGN PATENT DOCUMENTS

| | | |
|---|---|---|
| EP | 0557816 | 9/1993 |
| EP | 0790545 | 8/1997 |
| WO | WO9421382 | 9/1994 |
| WO | WO9961158 | 12/1999 |

\* cited by examiner

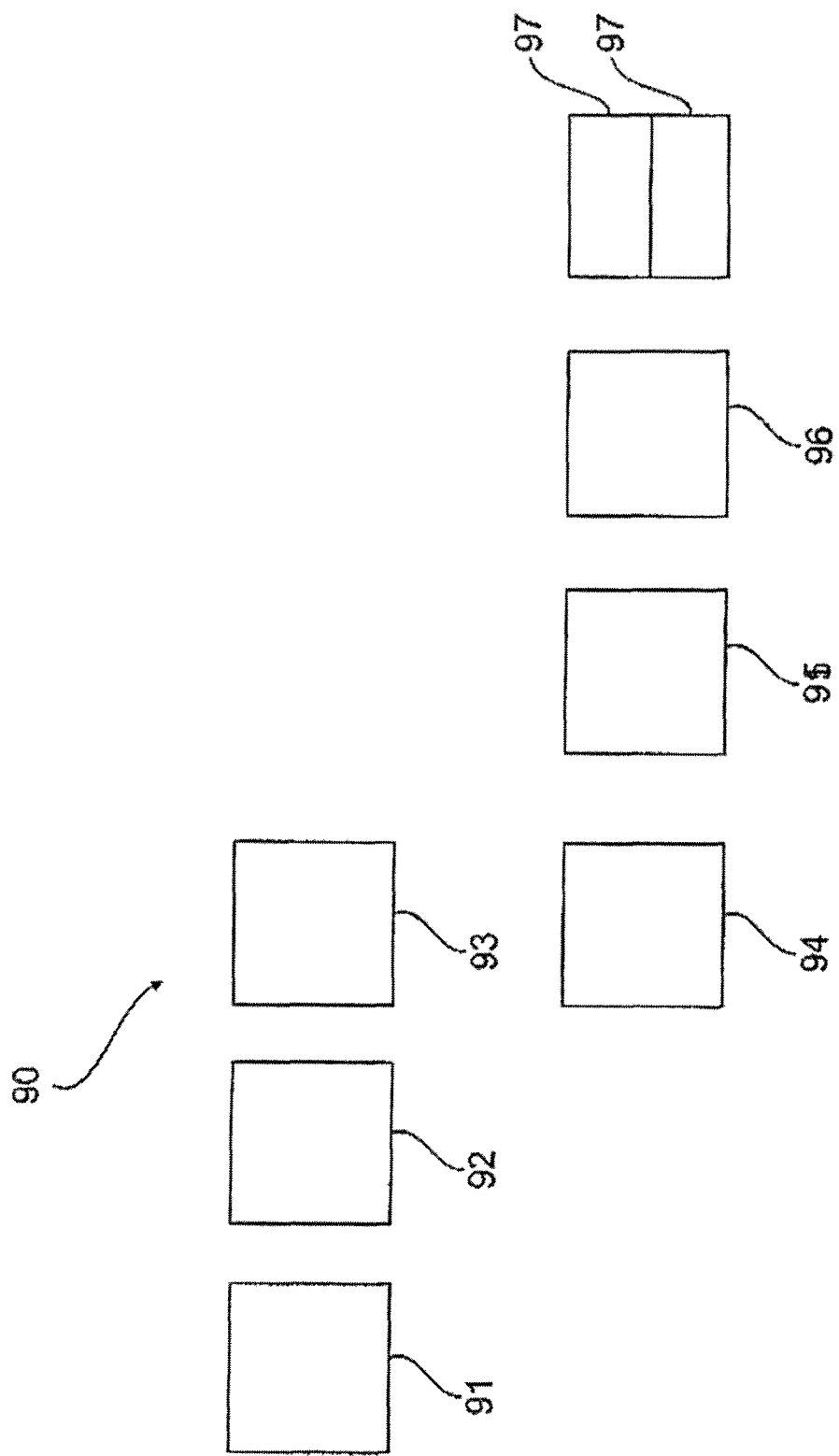

US 9,469,049 B2

METHOD AND INSTALLATION FOR SEPARATING INDIVIDUAL VALUABLE MATERIALS FROM MIXED, IN PARTICULAR MILLED, PLASTIC WASTE

FIELD OF THE INVENTION

The invention relates to a method and an installation for separating individual valuable materials from mixed, in particular milled, plastic waste, comprising films, laminated films and hard plastic parts, plus optionally impurities.

BACKGROUND TO THE INVENTION AND PRIOR ART

Mixed plastic waste usually contains, apart from a large number of different types of plastic, further valuable materials in part firmly connected to one another, as well as impurities.

Although many individual process steps for the recycling of such plastic waste are known in the prior art, such as for example the mechanical milling of the plastic waste into a ground material or the separation of two components by means of sink-or-float separation or by means of the new near-infrared separation technique, the known methods are bound up with the drawback that a high separation selectivity, which is a pre-requisite for obtaining plastics of high and constant quality, cannot be achieved for such mixed plastic wastes.

For sustained recycling, it is necessary to separate the individual materials in a manner that is as grade-pure as possible, in order that they may successfully replace new goods free from impurities in markets segments and can therefore contribute significantly both to the competitiveness of the end product as well as to the preservation of resources.

If the mixed plastic waste is, for example, rejects from liquid cartons for drinks such as milk, fruit juice or suchlike, which upon separation of the paper fibres become available for cardboard production in the paper-mill, then films, laminated films, hard plastic parts and residual paper fibres are contained in this mixed plastic. The films predominantly comprise low-density polyethylene (LDPE), the laminated films comprise aluminium foil and LDPE film, and the hard plastics from the lips and closure caps comprise high-density polyethylene (HDPE) and to a lesser extent polypropylene (PP). Moreover, such drinks cartons also contain a quantitatively negligible proportion of film strips of PA or PET, which are used to seal the line joint.

It is true that many individual process steps are known which could be used in the recycling of such a mixed plastic, but altogether they have not hitherto led to a situation where the quantitatively relevant plastic fractions of the drinks cartons or the rejects are separated in any one process into their individual valuable material fractions in a way such that they can be recycled as pure materials.

The current practice in the recycling of the predominant quantity of drinks carton rejects is their use for energy purposes in cement kilns and/or refuse incinerators. Out of the approximately 106 MJ/kg of accumulated energy content contained on a statistical average in the drinks carton rejects, just around 23 MJ/kg of reject is utilised in energy terms in the case of their recycling in the cement kiln, despite its very good energy utilisation efficiency. In the utilisation of drinks carton rejects for purposes of energy, approximately 83 MJ/kg of the accumulated energy contents contained therein is therefore lost, which corresponds to approximately 78%.

As the oldest practised material recycling process for these rejects, mention may be made of the so-called Corenso process (Finland). Apart from the utilisation of the plastic components of the drinks cartons for energy, it also includes at least a material recycling operation for the aluminium fractions. According to VDI Nachrichten dated Oct. 6, 2005, the rejects undergo pyrolysis in this process in a gas reactor at temperatures above 400° C. The polyethylene begins to gasify from 400° C. (pyrolysis gas), the aluminium being maintained in solid form at this temperature. During its combustion, the combustible pyrolysis gas then delivers electrical and thermal energy. The aluminium occurs as an agglomerate and is necessarily contaminated by the gasified impurities. After an operation of the installation lasting over 10 years, it can be stated that this technique has not been installed once again worldwide, although there is worldwide interest in recycling the rejects of drinks cartons in terms of material. In contrast, it has to be stated that the Corenso installation is no longer producing in 2009.

A new process for reject recycling was commissioned in a pilot plant close to São Paulo in Brazil ("Mit dem Ziegelstein gegen den Klimawandel", Journal Getränkeindustrie November 2007, pages 10 and following). In this process, the rejects are treated with a plasma beam at over 1100° C. The plastics are decomposed into a low-grade ethylene glycol on account of the large number of types of plastic present in the rejects, said ethylene glycol having to be reprocessed in a refinery. The aluminium of the rejects leaves the process in recyclable bar form. Even though the polyolefins of the rejects are recovered as low-grade ethylene glycol, a very large proportion of the accumulated energy consumed for the production of the new goods therefrom is lost on account of the very high energy expenditure of this process on the one hand and on account of the low energy content of the low-grade glycol on the other hand.

SUMMARY OF THE INVENTION

The problem underlying the invention is to provide methods and an installation for separating individual valuable materials from mixed, in particular milled, plastic waste comprising films, laminated films, hard plastics, plus optionally impurities, wherein the valuable materials including any metal components that may be present from plastic-metal composites can be recovered from the waste comparatively cost-effectively with a high degree of separation selectivity and purity.

This problem is solved by the method of separating individual valuable materials from mixed, in particular milled, plastic waste, which comprises film parts, laminated film parts and hard plastic parts, plus optionally impurities, wherein the method includes the step of a) any impurities are separated from the plastic waste, b) the plastic waste is separated into hard plastics and films on the one hand and laminated films on the other hand, c) the hard plastics are separated from the films, d) the hard plastics are separated into their plastic types, and e) at least one separation step comprises a sink-or-float separation. The fraction of the hard plastics is purified by means of a downstream separation stage, from the heavy impurities jointly separated beforehand.

Accordingly, methods and an installation for separating individual valuable materials from mixed, in particular milled, plastic waste comprising film parts, laminated film parts and hard plastic parts plus optionally impurities have been created, wherein the impurities, insofar as they are present, are first separated from the plastics and the plastics then undergo individual separation steps.

The plastic waste can be separated into films and laminated films on the one hand and hard plastics on the other hand, the laminated films are separated from the films, the hard plastics are separated into their plastic types, and at least one separation step comprises a sink-or-float separation.

For this purpose, the plastic waste, which may be present milled in the form of ground material particles, can first be fed to a mechanical separation device which, with a supply of water or in a dry mechanical manner, again isolates the individual reject components which had become intimately bonded together, for example on account of the baling press operation expediently carried out beforehand, amongst other things for transport reasons, and which at the same time frees said components from interfering light small impurities, such as for example paper labels and paper fibres. In the isolated state, iron-containing impurities can then also be reliably separated with magnets. If need be, a sink-or-float tank can be used for the separation of organic impurities, wherein the impurities sink and the plastics float.

The plastic waste then undergoes air sifting or another separation method, in order to separate the hard plastics and any heavy impurities that may be present as a heavy fraction as well as the films and laminated films as a light fraction.

In all the embodiments of the invention, one or more of the following, in particular, come into consideration as hard plastics. In the overwhelming majority of cases, the hard plastics are injection-moulded plastic products. The products produced using the different variants of the blow-moulding techniques (e.g. injection blow-moulding technique) will represent the second largest product group of the so-called hard plastics, which also include as a third product group the—compared to the films—thick-walled, deep-drawn plastic products. Even though there are differences with regard to preferred viscosity and therefore molecular weight distribution between the different types of plastic themselves that are used for the different techniques involved in hard plastics production, the group of hard plastics differs overall very markedly in respect of these two properties from those of the group containing types of film plastics. Accordingly, plastic waste products can be split up indirectly by air sifting into fractions having different viscosity ranges.

The hard plastics (heavy fraction) and the films and laminated films (light fraction) in each case can be separated and, in particular, are further processed in their own processing lines, i.e. optionally cleaned and split up into their respective valuable material components.

For this purpose, the hard plastics and films/laminated films to be separated are separated respectively as part of an expediently degassed suspension and, in particular, are fed to their own device for the sink-or-float separation.

The density of the separation medium is preferably selected in such a way that it corresponds to the density at the point of intersection of the two density distribution curves of the two fractions separated from one another by means of sink-or-float separation. The two density distribution curves can be ascertained by the fact that, from a sufficiently large number, e.g. 200, of ground material particles, their density is measured individually using known methods, they are grouped together to form suitable small density fractions, and the particles per density fraction thus obtained are plotted on a distribution curve. If no point of intersection of the two density fraction distribution curves arises with a minimum, the sink-or-float separation is not suitable for separating the two fractions. According to the invention, this determination of the optimum density can be carried out for each charge of plastic waste and, if need be, can be carried out periodically during the recycling of a charge.

The degassed suspension can be produced in two ways. The preferred way consists in the fact that the ground material particles are first mixed while stirring with the separation medium, i.e. they are suspended, and this suspension is then degassed by the application of a vacuum, in particular in a separate container. The second possibility consists in the fact that the separation medium is first degassed alone, before it is processed with the ground material particles to form a suspension. With this method, however, there is the risk of too much air getting into the suspension again during the stirring process with this mode of preparation of the suspension and of the degassing not therefore being sufficient.

The fractions which are separated with a high degree of separation selectivity, by means of a degassed suspension as well as a knowledge of the optimum separation density, from the pure plastic films using a sink-or-float separation technique (e.g. with the separation technique according to EP 1618960 B1 or with known sorting centrifuges from, for example, the firm Flottweg), and which comprise two or more components which are present as multi-material composites either on account of identical density or on account of mechanical and/or chemical bonds, can now be treated, insofar as the quantity and value of one of the components makes it economically reasonable, by means of selective dissolution processes in the next process sub-step, in such a way that at least one further type-pure high-grade material fraction is obtained. "Selective dissolution process" means that a solvent and process conditions are selected in such a way that only the targeted plastic is dissolved, so that all the other composite components can be removed from the solution by means of the known solid/liquid separation techniques (filters, centrifuges, decanters), before the polymer is isolated again from the solution and composed to form a new plastic.

If one of the separated air-sifter and/or density-separation fractions, such as arises in the case of drinks carton rejects, is made of metal-plastic laminated film shreds, this fraction preferably also undergoes the aforementioned selective solvent treatment following its separation. In this case, only the LDPE plastic component of the composite is expediently dissolved. Foreign plastics of this fraction, such as for example polyamide and polyethylene terephthalate particles, remain undissolved and are removed from the solution with the free metal and, in particular, aluminium foil shreds by means of the known solid/liquid separation techniques.

Using the method according to the invention, it is possible with mixed plastics to recover all the plastic fractions as type-pure valuable materials with purities of over 97 wt. % and in particular over 99 wt. %.

Surprisingly, it has been shown that, with a consistent application of the new method, the most important plastic fractions in terms of quantity are recovered with a high degree of purity and quality consistency, in such a way that they can replace new plastic goods in market segments. The specific process energy for this method lies in the range of below 20 MJ/kg, so that, out of the 106 MJ/kg of accumulated energy contents of the rejects mentioned above, approximately 70% is still retained taking account of the material contraction.

The plastic waste can be separated into hard plastics and films on the one hand and laminated films on the other hand after separation of any impurities from the plastic waste, and the hard plastics are then separated from the films and the hard plastics separated into their types of plastic. Here too, at least one separation step comprises a sink-or-float separation, and the aforementioned details and/or modifications are also applicable to this method.

In contrast with the embodiment described above, therefore, the laminated films are first separated, and as the case may be fed to a further processing operation, and in a second step the films are separated from the hard plastics. Surprisingly, a further improvement in the separation selectivity and the throughput arises as a result.

Further embodiments and features of the invention emerge from the following description, the figures and the claims.

DESCRIPTION OF FIGURES

FIG. 9 shows an embodiment of an installation according to the invention.

DETAILED DESCRIPTION OF INDIVIDUAL EMBODIMENTS

Figure 1:
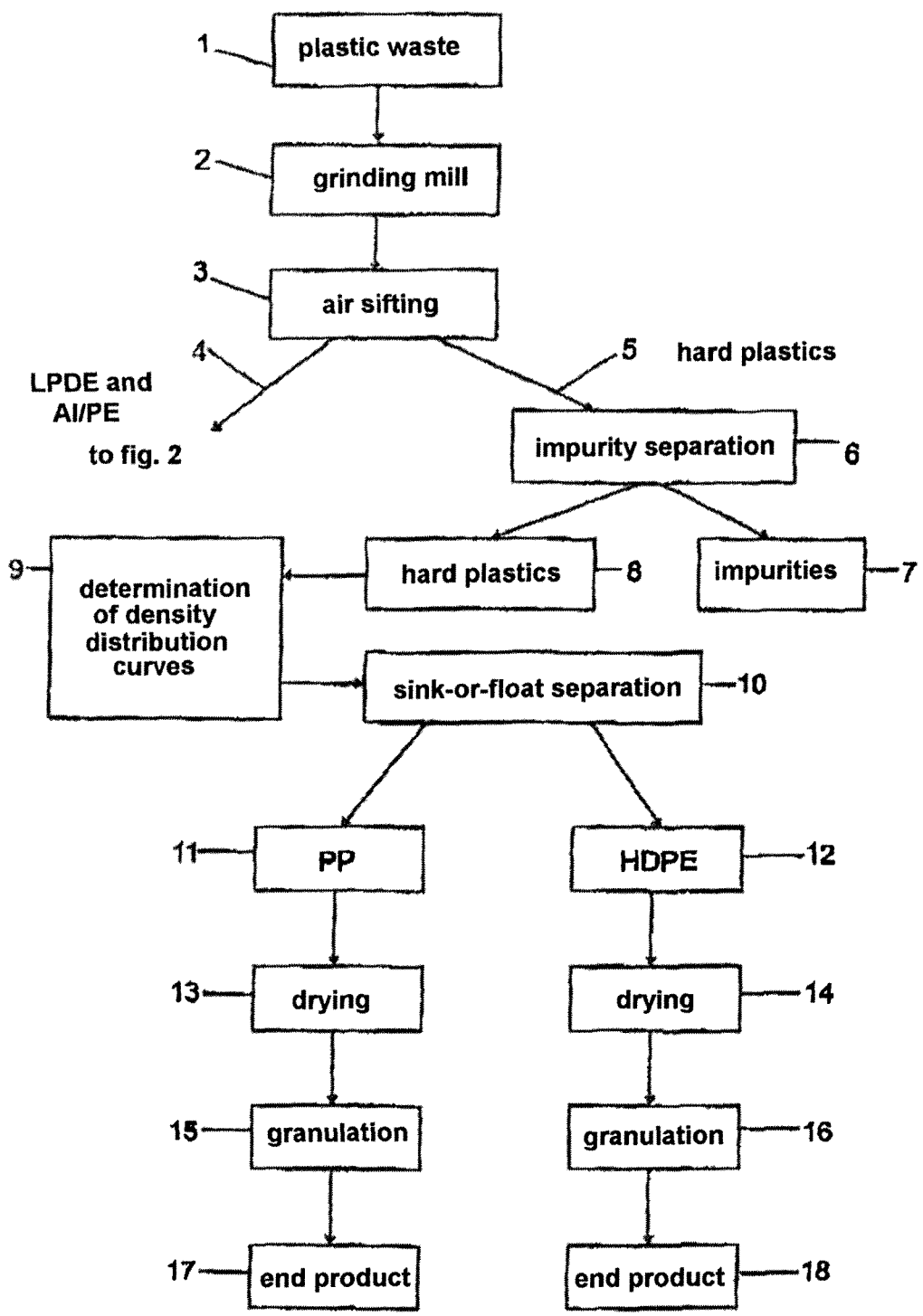
FIG. 1 shows a first part of a flow diagram of a first embodiment of the method according to the invention.
Figure 2:
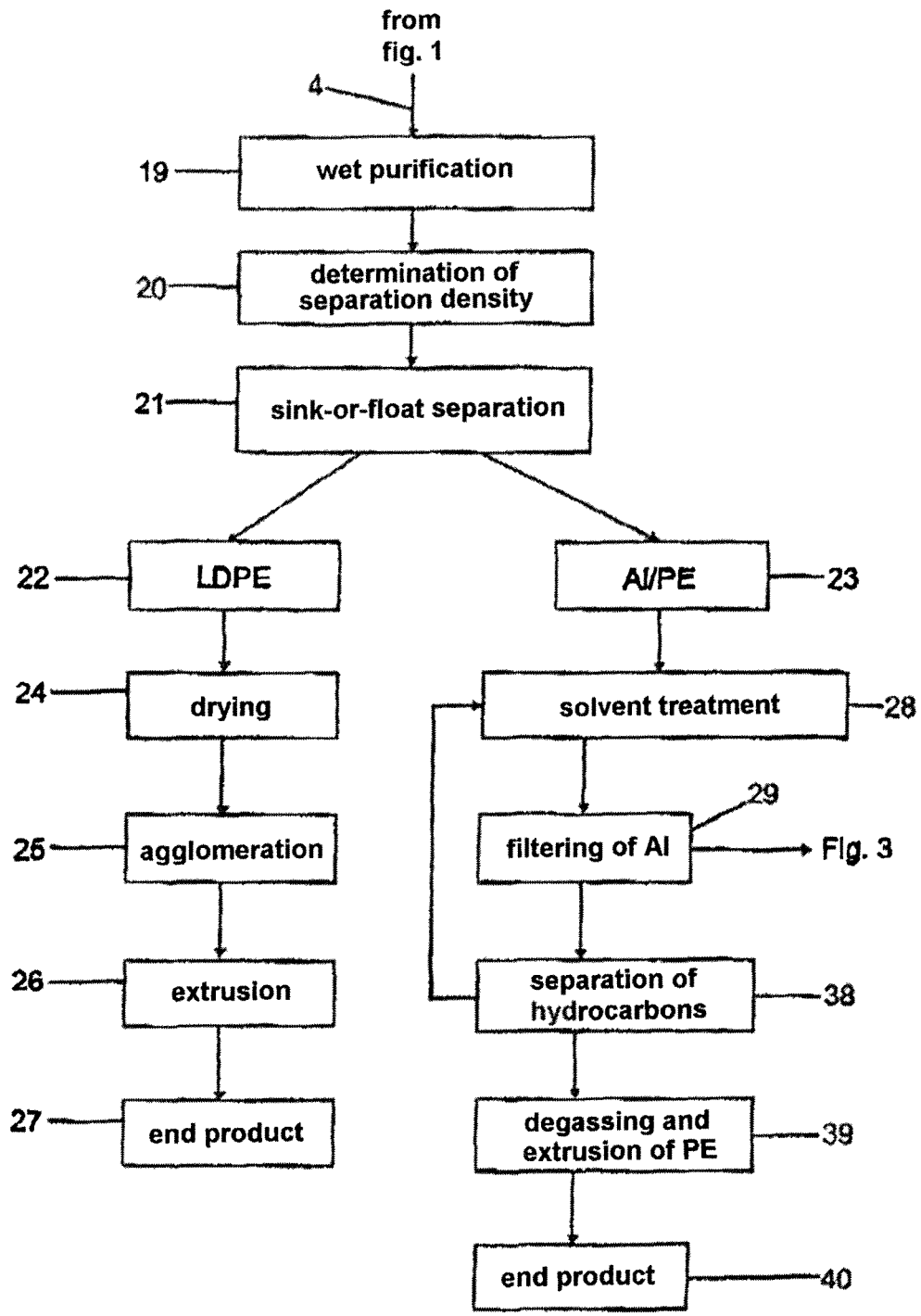
FIG. 2 shows the second part of the flow diagram of FIG. 1.
Figure 3:
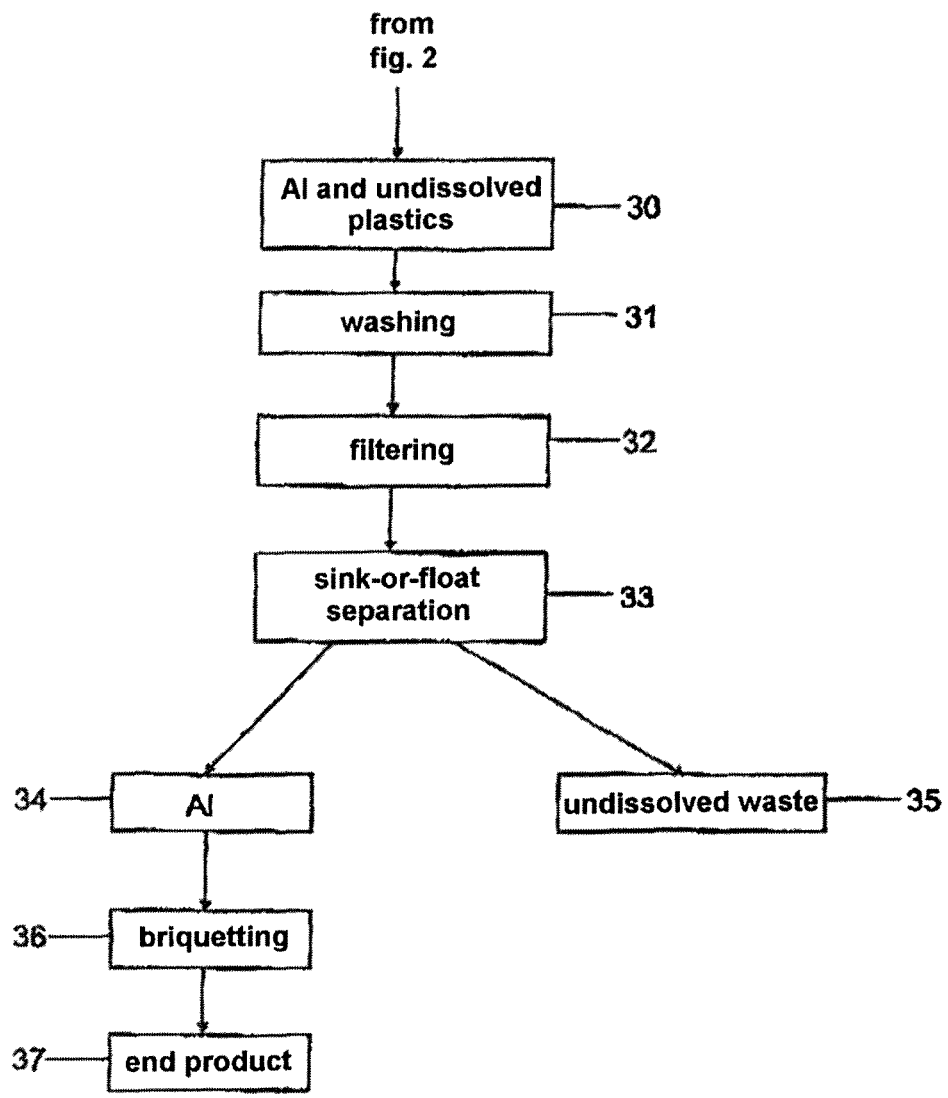
FIG. 3 shows the third part of the flow diagram of FIG. 1.

The description of the method according to the invention is made using a non-limiting example of the recycling of liquid cartons, making reference in the first place to FIGS. 1 to 3, the technical details being transferable to all the methods and installations according to the invention.

Milled plastic waste comprising shredded liquid cartons is fed to the process, see step 1. This ground material or reject essentially comprises plastic films, laminated films of aluminium and polyethylene (Al/PE films), hard plastics such as for example HD-PE and PP closures, small quantities of paper fibres, small quantities of technical plastic films such as for example polyamide and PET, as well small quantities of impurities such as metal particles, textiles, sand etc.

According to the invention, a dry-mechanical separation of the residual paper fibres from the plastics takes place in a step 2. For this purpose, use is made of a grinding device, which either comprises a friction centrifuge known to the person skilled in the art or a modified hammer mill, the sieve hole size whereof can be selected such that the palm-sized reject films are isolated, but not reduced in size. In the case of the friction centrifuge, the operation is preferably carried out wet, i.e. liquid is added to the rejects in order to prevent overheating of the ground material. At the same time, this liquid assists in removing the small impurities, such as paper labels, paper fibres and sand etc. through the slots of the horizontal centrifuge casing cylinder. In the case of the hammer mill, an air flow, which is blown through the hammer mill, carries all the light impurities out of the system to the air filters. In the case of the friction centrifuge, cleaning can be carried out dry, but also wet, i.e. with the addition of washing medium. In the case of the hammer mill, the operation is carried out solely in a dry manner.

The ground material originating from step 2 is fed to a step 3, wherein the ground material is divided into a light fraction and into a heavy fraction by means of air sifting, for example in a known zigzag sifter.

All the particles which are carried out upwards by the air flow at the adjusted air speed are removed with the light fraction. As a rule, these are all the film particles (LDPE and Al/PE films), but they can also include individual paper shreds, individual paper fibres, cork and EPS particles as well as small ground material particles from the fraction of the hard plastics. The light fraction is further processed in branch 4 of FIG. 1, which is dealt with in FIG. 2.

In the heavy fraction, most of the hard plastics, heavy impurities (e.g. metal particles, textiles, minerals, small wood particles) as well as undissolved paper fibre lumps are contained, which may occur when use is made of a hammer mill whose sieve plate holes were too large. Once separated from the light fraction, the heavy fraction is further processed in branch 5 of FIG. 1.

In step 6, interfering, exclusively heavy impurities 7 are first separated from the heavy fraction, in order to separate only hard plastics 8 for further processing. There are a number of possibilities regarding the tool for this impurity separation. A suitable instrument for this task is the so-called ballistic sifter. A second possibility is also offered at this point by the zigzag air sifter, the air speed whereof is adjusted in this case such that only the hard plastics are removed as a light fraction, but not the impurities. A third possible aid for this task is also a sink-or-float separation. Further machines that may be suitable are known to the person skilled in the art.

A following sink-or-float separation of the hard plastics, which is preferred here, exhibits optimum separation selectivity, in particular with the following considerations.

The particle density of plastics is made up of the densities of its components and their fractions in the given plastic, once any possible vacuoles are disregarded. Components of the plastic are its polymer as well as the fluctuating additives/admixtures, which can vary from manufacturer to manufacturer and over time. In addition, new types of plastic with new densities may be used by the manufacturer without warning. According to the invention, therefore, use is not made of a predetermined or theoretically determined constant density with which the pile of ground material particles can be separated from hard plastics of the rejects.

Instead, an optimum density for the separation medium is determined empirically in a step 9, and more precisely at least at the start of the separation, in order to obtain the greatest possible purity of the two fractions to be separated.

Figure 4:
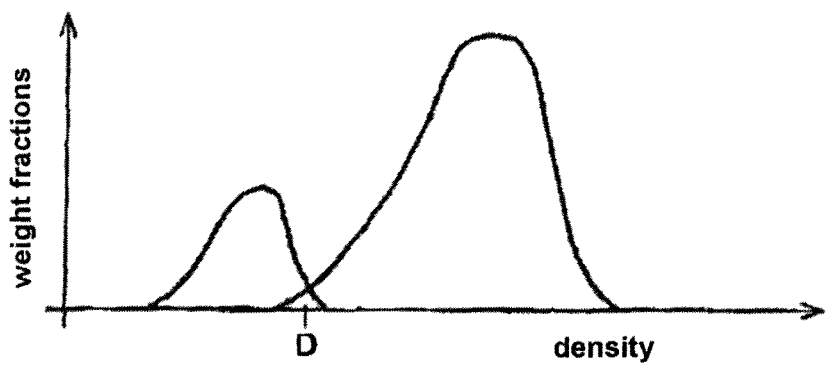
FIGS. 4, 5 and 6 illustrate in each case a density distribution curve.

For this purpose, the density distribution curve of hard plastics 8 is first determined. FIG. 4 illustrates, by way of example, a density distribution curve of hard plastics 8, which have been separated from drinks carton rejects by means of an air-zigzag sifter. In this example, hard plastics 8 comprise PP hard plastics and HDPE hard plastics. The density distribution curves of PP and HDPE in the sample intersect at one point. Density D at this point should be selected for the separation medium in order to achieve optimum separation of PP and HDPE.

Figure 5:
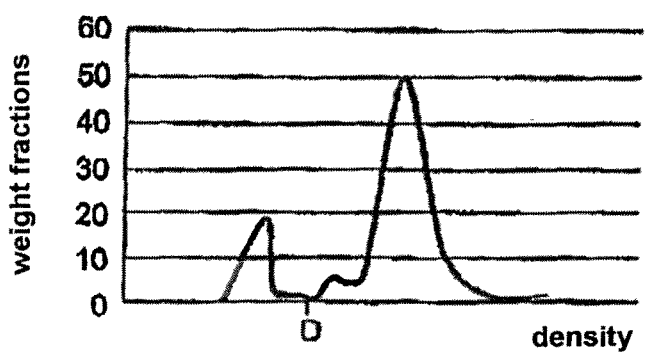

FIG. 5 shows an example of a measured density distribution of hard plastics 8. A broad minimum can be detected between the two density distribution curves of main components PP and HDPE of hard plastics 8, i.e. at density D. The density values in these examples are not indicated quantitatively, since it does not concern the specific density values which possibly fluctuate over time, but only the characteristic of the density distribution curve. The separation cut can be freely selected in the density minimum, but in the case of particular demands made on the purity it can be additionally optimised at the minimum with the aid of an analysis of the composition of the sub-fractions.

For the separation of the hard plastic particles into an HDPE and PP fraction in step 10, the device for the sink-or-float separation known from EP 1618960 B1 is preferably used here, so that a separation selectivity of up to 99.5% can be achieved, but use may also be made of other precise sink-or-float separation devices for this purpose, such as for example the sorting centrifuges from Flottweg.

It is possible to dispense with the degassing of the suspension in cases in which the separation liquid dissolves little air, little air or scarcely any air is introduced into the system during preparation of the suspension and the separation liquid wets the hard plastic particles very thoroughly. In all other cases, degassing of the suspension is required to achieve high degrees of purity also in the case of the hard plastic sink-or-float separation, in order to ensure that not even the smallest air bubbles can adhere to the ground material particles, which otherwise falsify their effective density and cause heavy fraction particles, for example, to float at the surface in the same way as a lifebelt causes the swimmer to float at the surface.

For the separation of the hard plastics of drinks cartons, on account of their bright colour, it is also perfectly possible in principle, as an alternative, to consider a separation by means of near-infrared separation technology, if lower demands are made on the yield (<95%) and on the purity of the plastic (<96%). However, in order to obtain the highest degrees of purity (>97% and >99%) and yields (>97%) in the case of hard plastics, the use of a precise sink-or-float separation technique is also required with this fraction.

The ground material of the PP and HDPE fractions 11, 12 from step 10 is preferably first dried mechanically by means of centrifuges and then thermally, step 13, 14.

In order to increase the purity and uniformity of the end products, both fractions 11, 12 can, following the drying, be finally purified by means of an extruder, which is equipped with a melt filter, and at the same time be provided with new additives.

Following the drying, both ground materials can also be fed in step 15, 16 to a degassing extruder instead of to a normal extruder, in order to remove, for example, soluble foreign chemicals as required for a foodstuffs permit, and if desired are granulated. The granulates are pure valuable materials and form here the two end products 17, 18.

Independently of the processing of the heavy fraction in branch 5, the light fraction comprising the plastic films and the Al/PE laminated films is processed as follows in branch 4, see FIG. 2. The aim here is to separate the Al/PE laminated film from the pure LDPE films and, with a high yield (>95%), to obtain a very pure LDPE film fraction with an Al/PE laminated film content <2 wt. %.

Light fraction 4 can next undergo a wet purification in step 19 in order to remove the residual impurities. Standard procedures are available for this step.

A sink-or-float separation process then follows. The aim here is to separate the Al/PE laminated film from the pure LDPE films. The following steps are expediently carried out for the sink-or-float separation. Light fraction 4 is suspended in a separation medium and is brought into a vacuum system in order to remove air adhering to the particles. The density of the separation medium is selected, step 20, such that the Al/PE laminated film and the remaining plastics are separated on account of the differing densities. The light parts, i.e. the purely polyolefin plastics, float here as a light fraction, step 22, whereas the heavy parts, i.e. here the Al/PE laminated film, sink, step 23.

To this end, the density distribution curve of the supplied LDPE-Al/PE light fraction 4 is first determined in step 20. This can take place by measuring the density of a sufficient number of particles individually, then the weight of the particles is determined in individual density ranges and, put into a ratio to the overall weight of the number of particles, is plotted in a diagram, see diamond-shaped measurement points of FIG. 6. The density at the point of intersection between the density distribution of the LDPE and the density distribution of the Al/PE is selected as the density for the separation medium.

In the case of this film material, only a sink-or-float separation method comes into consideration as a separation method in step 21. It is also the case here that the sink-or-float method according to EP 1618960 B1 is particularly well suited for this separation. If need be, however, any other known sink-or-float separation device can also be used in a two-stage process in its first stage, which would then separate with water and without degassing. In the second stage of this installation required for the high purity, in which the light fraction contaminated with Al/PE laminated films would then again have to be separated in order to obtain a pure plastic fraction free from Al/PE-laminated film, it would then be necessary to operate with a degassed suspension using the method according to the invention.

With the method according to the invention, therefore, the following steps are therefore expediently carried out for sink-or-float separation 21: Light fraction 4 is suspended in a separation medium, the density whereof corresponds to the point of intersection that has been determined with the aid of the determination of the two density distribution curves of the two fractions carried out in step 20, and is introduced for example into an evacuated agitator vessel in order to remove air adhering to the particles. The dwell time in this evacuated agitator vessel should be as long as possible, but at least 2 minutes and preferably 30 minutes. The lower the underpressure in the evacuated agitator vessel, the shorter the dwell time can be.

The obtained LOPE light fraction from the polyolefin films is mechanically and in particularly thermally dried as in the case of the hard plastics, step 24, before it is agglomerated in step 25 and finally extruded into granulates in step 26. The melt is also filtered and provided with additives. The granulates thus produced are a valuable material which is available as end product 27 with constant quality.

The heavy fraction, in the present example comprising Al/PE laminated film which has sunk to the bottom, undergoes a solvent treatment, step 28, in order to detach PE fractions from the aluminium. Cyclohexane is preferably used as the solvent.

After filtering, step 29, of the undissolved aluminium and any undissolved plastics 30 (FIG. 3), the aluminium and, as the case may be, the undissolved plastics 30 are washed with fresh solvent in step 31, and again filtered, step 32. In step 33, aluminium 34 is then separated from undissolved waste 35 using standard solid/liquid separation methods, preferably centrifuges and/or decanters. Purified following an optionally provided wash with fresh solvent, aluminium fraction 34 forms a highly pure valuable material. Apart from the aluminium, it admittedly also contains small proportions of technical plastics with densities <1 g/cm$^3$ (e.g. polyamide and PET), so that it may be economically sensible, depending on their quantitative proportion, to free the aluminium from these impurities in a further sink-or-float separation with a density which lies between that of the Al and that of the plastic fractions. The Al thus treated is then present in a purity of up to 98%. If need be, it is briquetted for more reliable handling, step 36, and made available as a valuable material end product 37.

The remaining solution is for example centrifuged in order to remove residual impurities, and the solvent, in this case cyclohexane, can be separated for example by means of a flash evaporation technique from the firm Sulzer/Switzerland in step 38. In accordance with the prior art, separated solvent is finally purified by means of filters and distillation, and according to the invention it is expediently fed back to the process in step 28.

Valuable material PE forms, if need be after degassing, extrusion and/or the addition of stabilisers in accordance with the prior art in step 39, valuable material end product 40.

In a second embodiment of the invention, the plastic waste is not initially separated into hard plastics on the one hand and laminated films and films on the other hand, but rather into hard plastics and films on the one hand and laminated films on the other hand. The technical details of the individual steps can be implemented as above in respect of the first embodiment.

Figure 7:
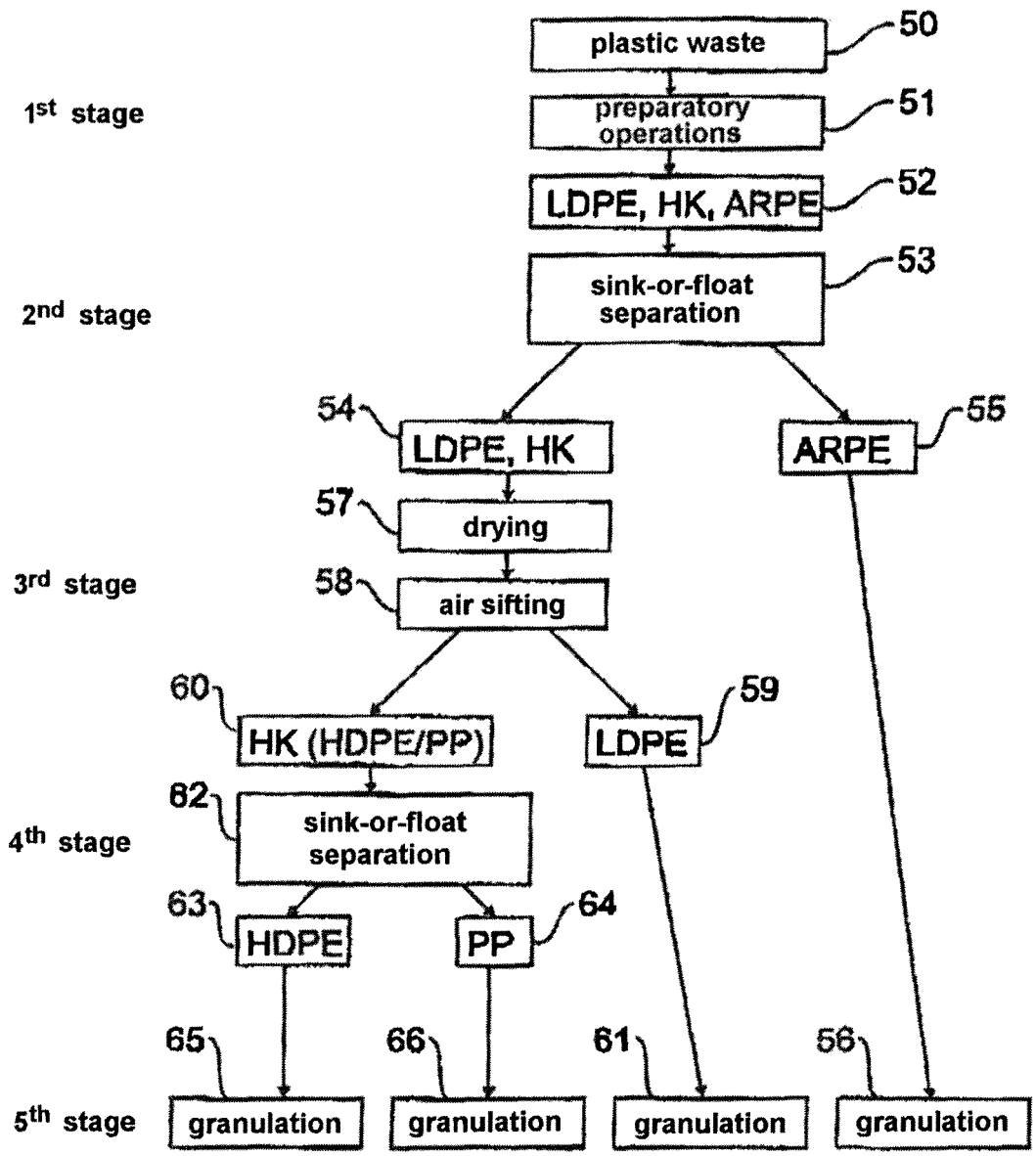
FIG. 7 shows a flow diagram of a second embodiment of the method according to the invention.

Plastic waste here also forms starting point 50, see FIG. 7.

The plastic waste first undergoes preparatory operations 51 in a first stage. Preparatory operations 51 are described below by reference to FIG. 8 and can comprise milling, isolation of all the elements, a dry and/or wet separation of impurities etc. An attempt should be made to arrange the preparatory operations in such a way that any organic and inorganic impurities are removed, in particular in such a way that paper fibres are no longer present, and that the plastic is ground as small as possible in order to separate any mechanical bonds of different plastics which may arise in coarse milling steps.

At the end of the first stage, only valuable plastics 52 are still present in the ideal case, in this case for example hard plastics (HK) of plastic types HDPE and PP, films such as LDPE and laminated films such as AlPE. Any paper fibres are removed in the ideal case, since they interfere with the subsequent separation.

Figure 6:
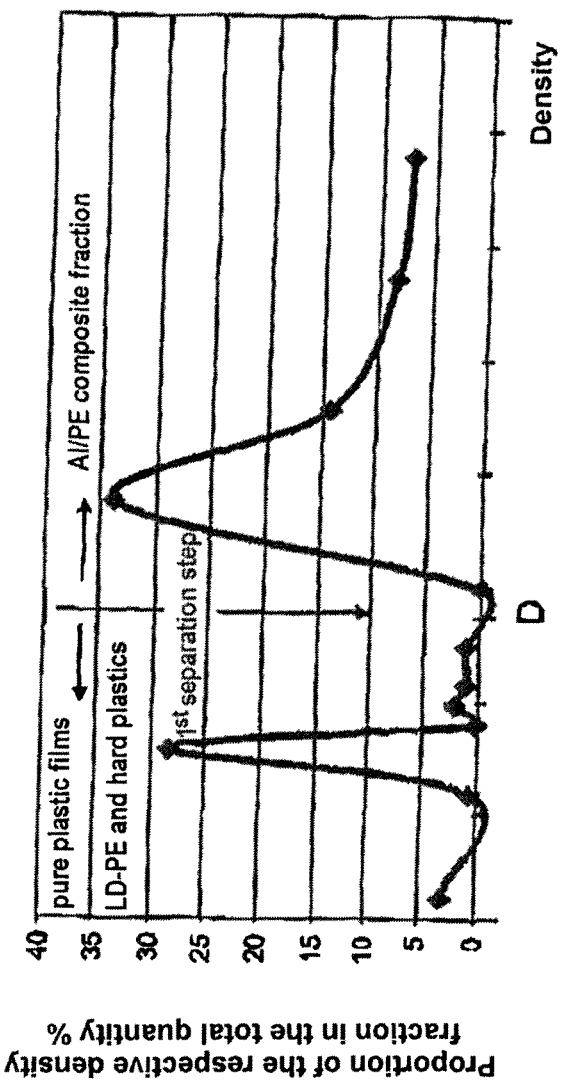

In a second stage, valuable plastics 52 are split preferably by means of sink-or-float separation 53 into, on the one hand, hard plastics HK and films 54 and, on the other hand, laminated films 55. The sink-or-float separation preferably takes place basically in an identical manner to sink-or-float separations 10, 21 and 33 described above by reference to FIGS. 1, 2 and 3 respectively, subject to the proviso that the density of the separation medium, for example according to FIGS. 4, 5 and 6, is adjusted to the existing fraction of HK and films on the one hand and laminated films on the other hand. The optimum density of the separation medium can be set by means of measured density distribution curves. Thus, the density distribution curve of the fraction of the hard plastics and films on the one hand and of the laminated films on the other hand is preferably determined, i.e. measured. The optimum point of intersection is then read off from the curve. This is described above by reference to FIG. 6.

Separated AlPE 55 can then be dried and granulated 56 to form the end product or further processed, as represented in FIG. 2 for the AlPE 23.

The fraction from the remaining hard plastics and films 54 is further processed separately in a third stage in order to separate the films from the hard plastics. It is true that this can also take place by means of sink-or-float separation; however, it is advantageous to carry out, instead of the latter, an air sifting 58 or suchlike following, in particular mechanical, drying 57, e.g. blowing the films, so to speak, out of the hard plastics by the application of air. Light films LDPE 59 fly up, whilst heavy hard plastics 60 remain behind.

Films 59 can then be dried and granulated 61 to form an end product.

In a fourth stage, the hard plastics are separated into their plastic types. The already described sink-or-float separation 62 is preferably also used for this step. As a separation medium, use is preferably made here of a bio-oil or a water/alcohol mixture. These separation media can be particularly easily adjusted to the density distribution curves to be expected, and the adjustment can easily be adapted.

HDPE 63 on the one hand and PP 64 on the other hand are obtained, which can finally be dried and granulated 65, 66 to form the end product.

Instead of drying and granulation, other final processing steps can be provided in all the embodiments; in the simplest case, the wet end product is simply collected.

Figure 8:
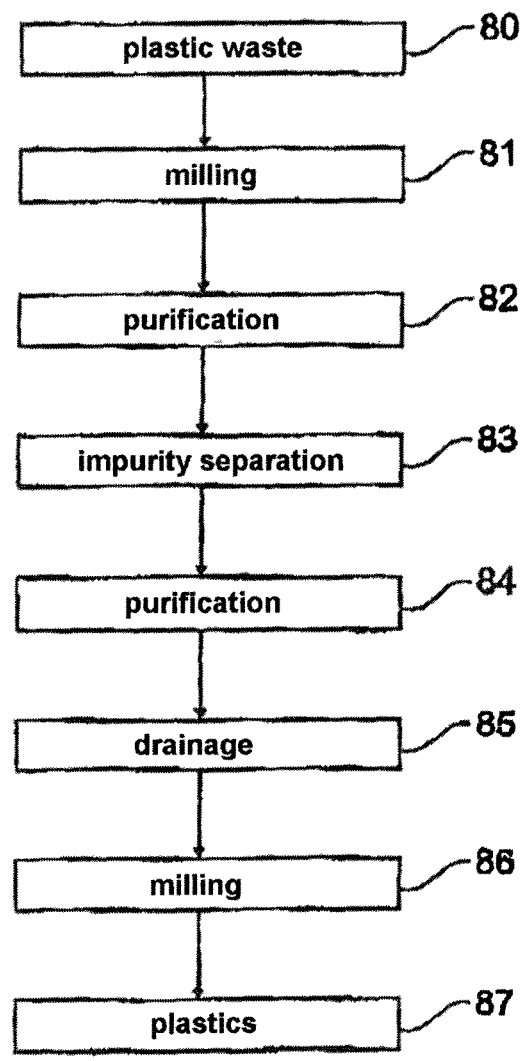
FIG. 8 shows a flow diagram of a first stage of the method according to the invention.

The first stage represented in detail by way of example in FIG. 8 can be used as a whole or in the individual steps in the two embodiments of the method for purification, milling and/or isolation.

The initial product is plastic waste 80. The latter can be present milled or unmilled. A first milling step 81 can be provided, wherein plastic waste 80 is ground for example palm-sized in a grinding mill or suchlike. This milling step 81 can be dispensed with if coarsely milled plastic waste 80 is already present.

Purification step 82 can follow in order to remove paper fibres and impurities such as sand, stones etc. This purification step can comprise wet purification.

A following impurity separation 83 can be provided, for example as a wet impurity separation in the form of a simple sink-or-float tank. In this sink-or-float tank, inorganic impurities such as FE, Ne, stones, earth, etc., are deposited, whereas the plastics float. A flotation can be provided for this purpose, i.e. application of air or suchlike in order that the plastics float.

The plastics can then be purified 84. A friction washing unit is suitable for this, wherein further milling and/or isolation of the plastics and optionally dissolution and/or isolation of paper fibres still present can take place at the same time.

Drainage 85, e.g. in a friction centrifuge, can follow.

Finally, further milling 86 can be provided, for example in a cutting mill, insofar as the desired size of the plastic particles has not yet been achieved for the subsequent separation process according to any of the embodiments according to the invention. Attempts are made to obtain plastic particles as small as possible, e.g. smaller than 30 mm, in particular smaller than 20 mm, preferably smaller than 10 mm, more preferably smaller than 5 mm and at best smaller than 3 mm or 2 mm. The smaller the plastic particles, the less the probability of their being bonded mechanically to other plastic particles, especially of a different kind, or impurities such as paper fibres for example; with a size of approximately 5 mm to approximately 10 or 12 mm, much better results are obtained than with a size above 10 or 12 mm.

The methods according to the invention can be carried out in an installation comprising means for carrying out the individual process steps.

An installation 90 is shown diagrammatically by way of example in FIG. 9. Installation 90 can carry out the method according to FIG. 7, 8.

For the milling, purification, isolation and/or separation of impurities, means 91 are provided which can comprise a grinding mill, a sink-or-float tank, a friction washing unit, a mechanical drainage system and/or a cutting mill and optionally other expedient installations.

A device 22 for the sink-or-float separation, preferably according to EP 1618960 B1, or a sink-or-float tank is provided for the separation 53 of the laminated films 55 from the hard plastics and films 54.

The laminated films can be further processed in a suitable device 93. For this purpose, device 93 can comprise means for drying and granulation and/or means for performing branch 23 of FIG. 2.

A drying device 94 and an air sifting unit 95 can be provided for the separation of the films from the hard plastic. The films can be granulated in device 93 to form the end product or a separate device is provided for the films.

The hard plastics can be separated into the individual plastic types in device 92 for the sink-or-float separation with a re-adjusted separation medium or a further device 96 can be provided for the sink-or-float separation of the hard plastics.

Devices 97 can be provided for the drying and granulation of the individual hard plastics.

In one embodiment, only one device 92 is provided for various sink-or-float separations. Device 92 then has to be readjusted for each sink-or-float separation, i.e. purified, and the density of the separation medium and other parameters have to be readjusted. For a high throughput, therefore, a plurality of devices 92, 96 incorporated one after the other in process-related terms are provided, which each carry out a separation step. In particular, a plurality of devices 92 and/or 96 can be provided for the same separation step (hard plastics and films/laminated films; hard plastics), if the separation step is to be carried out in a number of stages one after the other for increased purity.

I claim:

1. A method for separating individual valuable materials from mixed plastic waste which comprises plastic film parts, plastic laminated film parts, and hard plastic parts, said method including the steps of:
   a. separating said plastic waste into a heavy fraction and a light fraction by a separation process, said heavy fraction including said hard plastic parts, said light fraction including said plastic film parts and said plastic laminated film parts, said separation process including an air sifting process;
   b. determining a density distribution curve of said heavy fraction and using said density distribution curve of said heavy fraction to separate said heavy fraction into various densities of hard plastic parts by a sink-or-float separation process;
   c. determining a density distribution curve of said light fraction and using said density distribution curve of said light fraction to separate said plastic film parts from said plastic laminated film parts by a sink-or-float separation process; and,
   d. processing said plastic film parts and said plastic laminated film parts by one or more processes, said one or more processes for said plastic film parts is selected from the group consisting of a drying process, an agglomeration process, and an extrusion process, said processes for said plastic laminated film parts include a) a solvent treatment process to detach a plastic portion of said plastic laminated film from a non-plastic portion of said plastic film, to cause some plastic to dissolve, and combinations thereof, and b) a filtering process to separate said dissolved plastic from said non-plastic portion of said plastic film.

2. The method as defined in claim 1, wherein said step of determining a density distribution curve of said light fraction is empirically determined by measuring the density of a number of particles from the quantity of particles of said light fraction, said step of determining a density distribution curve of said heavy fraction is empirically determined by measuring the density of a number of particles from the quantity of particles of said heavy fraction.

3. The method as defined in claim 2, including the step of separating said hard plastic parts in said heavy fraction from non-plastic components by one or more separation processes prior to said step of separating said hard plastic parts into various densities of hard plastic parts by a sink-or-float separation process, said one or more separation processes selected from the group consisting of a ballistic sifter, a zigzag air sifter, and a sink-or-float separation process.

4. The method as defined in claim 3, including the step of separating impurities from said light fraction by a wet purification process prior to said step of separating said plastic film parts from said plastic laminated film parts by said sink-or-float separation process.

5. The method as defined in claim 2, including the step of at least partially separating non-plastic impurities from said plastic waste by a separation process prior to separating said plastic waste into said heavy fraction and said light fraction, said separation process selected from the group consisting of a friction centrifuge and a hammer mill.

6. The method as defined in claim 5, including the step of milling said plastic waste by a grinding process to a particle size smaller than 40 mm prior to said step of separating said plastic waste into a heavy fraction and a light fraction.

7. The method as defined in claim 6, including the step of further processing said separated hard plastic parts by one or more processes selected from the group consisting of a drying process and a grinding process.

8. The method as defined in claim 1, including the step of separating said hard plastic parts in said heavy fraction from non-plastic components by one or more separation processes prior to said step of separating said hard plastic parts into various densities of hard plastic parts by a sink-or-float separation process, said one or more separation processes selected from the group consisting of a ballistic sifter, a zigzag air sifter, and a sink-or-float separation process.

9. The method as defined in claim 1, including the step of separating impurities from said light fraction by a wet purification process prior to said step of separating said plastic film parts from said plastic laminated film parts by said sink-or-float separation process.

10. The method as defined in claim 1, including the step of at least partially separating non-plastic impurities from said plastic waste by a separation process prior to separating said plastic waste into said heavy fraction and said light fraction, said separation process selected from the group consisting of a friction centrifuge and a hammer mill.

11. The method as defined in claim 1, including the step of milling said plastic waste by a grinding process to a particle size smaller than 40 mm prior to said step of separating said plastic waste into a heavy fraction and a light fraction.

12. The method as defined in claim 1, including the step of further processing said separated hard plastic parts by one or more processes selected from the group consisting of a drying process and a grinding process.

13. An installation for separating individual valuable materials from milled plastic waste which includes plastic films, plastic laminated films and hard plastic parts by carrying out a method according to claim 1.

14. A method for separating individual valuable materials from mixed plastic waste which comprises plastic film parts, plastic laminated film parts, and hard plastic parts, said method including the steps of:
   a. separating said plastic waste into a heavy fraction and a light fraction by a separation process, said heavy fraction including said hard plastic parts, said light fraction including said plastic film parts and said plastic laminated film parts, said separation process including an air sifting process;
   b. determining a density distribution curve of said heavy fraction and using said density distribution curve of said heavy fraction to separate said heavy fraction into various densities of hard plastic parts by a sink-or-float separation process; and,
   c. determining a density distribution curve of said light fraction and using said density distribution curve of said light fraction to separate said plastic film parts from said plastic laminated film parts by a sink-or-float separation process, said step of determining a density distribution curve of said light fraction is empirically determined by measuring the density of a number of particles from the quantity of particles of said light fraction, said step of determining a density distribution curve of said heavy fraction is empirically determined by measuring the density of a number of particles from the quantity of particles of said heavy fraction;
   d. separating said hard plastic parts in said heavy fraction from non-plastic components by one or more separation processes prior to said step of separating said hard plastic parts into various densities of hard plastic parts by a sink-or-float separation process, said one or more separation processes selected from the group consisting of a ballistic sifter, a zigzag air sifter, and a sink-or-float separation process;
   e. separating impurities from said light fraction by a wet purification process prior to said step of separating said plastic film parts from said plastic laminated film parts by said sink-or-float separation process;
   f. at least partially separating non-plastic impurities from said plastic waste by a separation process prior to separating said plastic waste into said heavy fraction and said light fraction, said separation process selected from the group consisting of a friction centrifuge and a hammer mill;
   g. milling said plastic waste by a grinding process to a particle size smaller than 40 mm prior to said step of separating said plastic waste into a heavy fraction and a light fraction;
   h. processing said separated hard plastic parts by one or more processes selected from the group consisting of a drying process and a grinding process; and,
   i. processing said plastic film parts and said plastic laminated film parts by one or more processes, said one or more processes for said plastic film parts is selected from the group consisting of a drying process, an agglomeration process, and an extrusion process, said processes for said plastic laminated film parts include a) a solvent treatment process to detach a plastic portion of said plastic laminated film from a non-plastic portion of said plastic film, to cause some plastic to dissolve, and combinations thereof, and b) a filtering process to separate said dissolved plastic from said non-plastic portion of said plastic film.

15. An installation for separating individual valuable materials from milled plastic waste which includes plastic films, plastic laminated films and hard plastic parts by carrying out a method according to claim 14.

* * * * *